(12) United States Patent
Kim (10) Patent No.: US 8,079,438 B2
(45) Date of Patent: Dec. 20, 2011

(54) SEAT FOR HEAVY EQUIPMENT HAVING BUFFER MEANS IN FORWARD AND BACKWARD DIRECTIONS

(75) Inventor: Hak Shin Kim, Masan (KR)

(73) Assignee: Volvo Construction Equipment Holdings Sweden AB, Eskilstuna (SE)

( * ) Notice: Subject to any disclaimer, the term of this patent is extended or adjusted under 35 U.S.C. 154(b) by 895 days.

(21) Appl. No.: 12/080,480

(22) Filed: Apr. 3, 2008

(65) Prior Publication Data

US 2008/0252114 A1 Oct. 16, 2008

(30) Foreign Application Priority Data

Apr. 16, 2007 (KR) .................. 10-2007-0036994

(51) Int. Cl.
*B60K 26/00* (2006.01)
(52) U.S. Cl. ......... 180/326; 180/329; 180/330; 248/561
(58) Field of Classification Search ............... 180/326, 180/329, 330; 248/561
See application file for complete search history.

(56) References Cited

U.S. PATENT DOCUMENTS

| 4,344,597 A | 8/1982 | Eimen |
| 2003/0112583 A1 | 6/2003 | Kim |

*Primary Examiner* — Eric Culbreth
(74) *Attorney, Agent, or Firm* — Ladas & Parry LLP

(57) ABSTRACT

A seat for heavy equipment having a buffer in forward and backward directions, which can protect an operator by attenuating impact and vibration generated in a cab in forward and backward directions of an excavator in accordance with the driving of the buffer in a main working mode of the excavator. The seat includes a lower member mounted on a suspension plate, an upper member slidably mounted on the lower member in forward and backward directions of the equipment, a buffer unit for attenuating impact and vibration generated in the forward and backward directions of the equipment, a tilting unit, and a locking unit. In a main working mode, a buffer function is performed through forward and backward movement of the upper member against the lower member, and when the main working mode is released, the buffer function is released.

7 Claims, 7 Drawing Sheets

SEAT FOR HEAVY EQUIPMENT HAVING BUFFER MEANS IN FORWARD AND BACKWARD DIRECTIONS

CROSS-REFERENCE TO RELATED APPLICATION

This application is based on and claims priority from Korean Patent Application No. 10-2007-0036994, filed on Apr. 16, 2007 in the Korean Intellectual Property Office, the disclosure of which is incorporated herein in its entirety by reference.

BACKGROUND OF THE INVENTION

1. Field of the invention

The present invention relates to a seat for heavy equipment having a buffer means in forward and backward directions, which can attenuate impact and vibration generated in a cab in forward and backward directions of the heavy equipment (i.e., an X-axis direction in which the heavy equipment travels) during working or traveling of the heavy equipment.

More particularly, the present invention relates to a seat for heavy equipment having a buffer means in forward and backward directions, which can protect an operator by attenuating impact and vibration generated in a cab in forward and backward directions of the heavy equipment in accordance with the driving of the buffer means selected by the operator in a main working mode of the heavy equipment such as excavating, loading rocks and dumping, traveling, or the like.

2. Description of the Prior Art

Generally, main working modes of an excavator include excavating, traveling, loading rocks and dumping, braking, and the like. Since the excavator works in very inferior environments and handles heavy loads, working devices such as a boom and so on are made of hard and rigid materials.

Accordingly, strong impact and vibration generated during the working of the equipment are directly transferred to the equipment through an upper swing structure. Since an operator, who repeats the same work in a specified operating posture, is exposed to such impact and vibration for many hours, the operator fatigue is increased and the working efficiency is lowered.

When the excavator is in the main working mode, impacts are generated in forward and backward directions (i.e., X-axis direction in which the equipment travels), in left and right directions (i.e., Y-axis direction), and in upward and downward directions (i.e., vertical direction or Z-axis direction).

It can be confirmed by experiments that impacts due to vibration generated in forward and backward directions are relatively larger than those due to vibration generated in left and right directions or in upward and downward directions.

Figure 1:
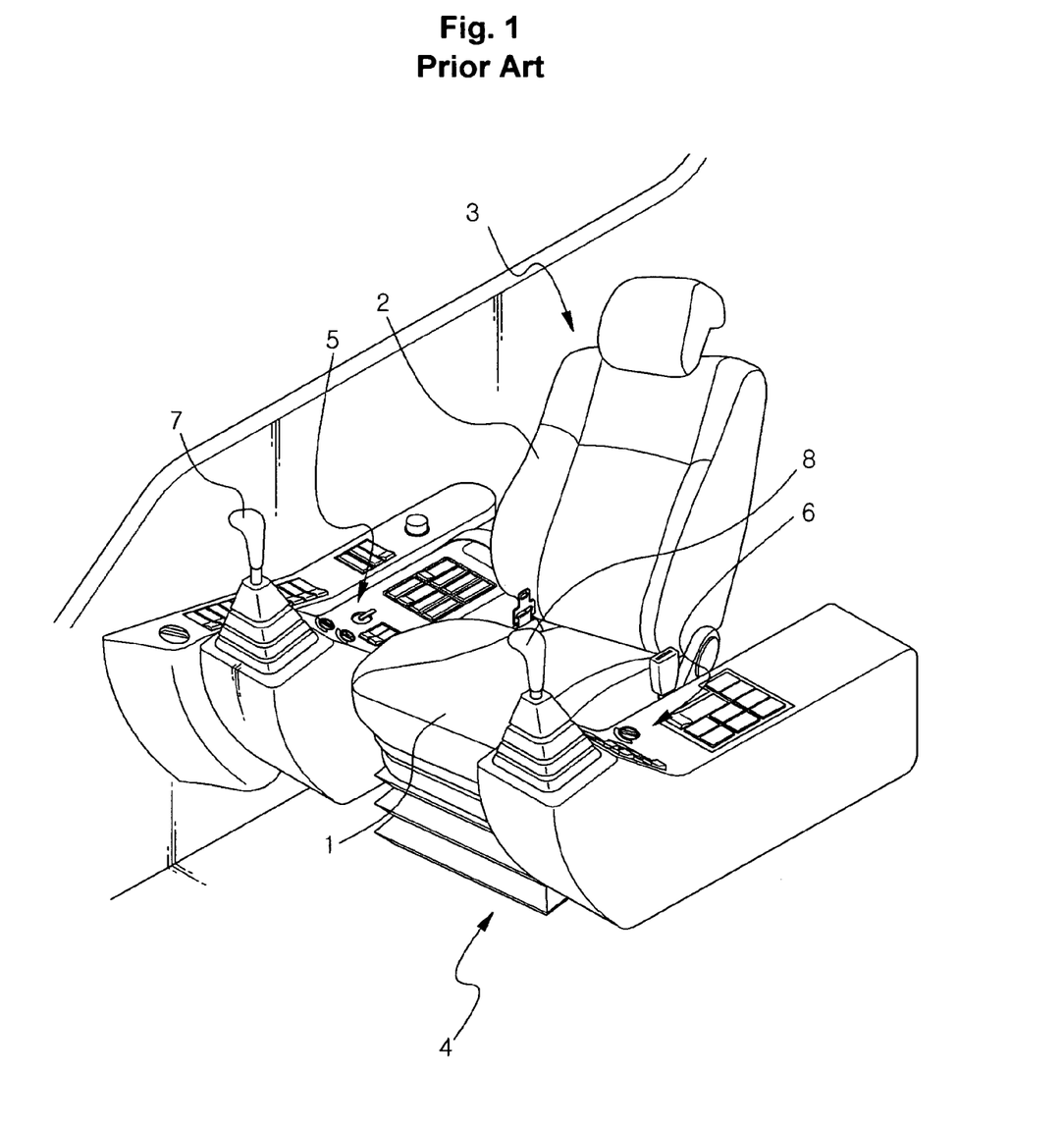
FIG. 1 is a schematic view illustrating a conventional seat for heavy equipment having buffer means.

As illustrated in FIG. 1, a conventional seat for heavy equipment having buffer means includes a seat 3 composed of a seat part 1 and a seat back part 2; and a suspension 4 (in which buffer means is installed) installed between a cab bottom surface and the seat part 1 to buffer impact and vibration vertically transferred to the seat part 1 through an upper swing structure (not illustrated) during traveling or working of the heavy equipment.

In the drawing, the reference numerals 5 and 6 denote console boxes mounted on left and right sides of the seat part 1 to control working devices, such as a boom, an arm, and the like, in accordance with an output of a manipulation signal corresponding to the amount of manipulation when manipulation levers 7 and 8 are manipulated by an operator.

According to the conventional seat having the buffer means, the impact and vibration, which are generated in upward and downward directions (i.e., Z-axis direction) of the equipment and transferred to the operator through the seat part 1 during the working or traveling of the equipment, can be somewhat attenuated by the buffer function of the suspension 4.

On the other hand, in the main working mode of the excavator, the impact and vibration, which are generated in forward and backward directions (i.e., X-axis direction) of the equipment and transferred to the operator, cannot be attenuated by the buffer function of the suspension 4. Accordingly, the operator is exposed to the impact transferred the suspension 4, and thus easily feels fatigued. Due to this, the reliability and the working efficiency of the expensive equipment may be lowered.

SUMMARY OF THE INVENTION

Accordingly, the present invention has been made to solve the above-mentioned problems occurring in the prior art while advantages achieved by the prior art are maintained intact.

One object of the present invention is to provide a seat for heavy equipment having a buffer means in forward and backward directions, which can protect an operator by attenuating impact and vibration generated in a cab in forward and backward directions of an excavator in accordance with the driving of the buffer means in a main working mode of the excavator.

Another object of the present invention is to provide a seat for heavy equipment having a buffer means in forward and backward directions, which can reduce operator fatigue and improve the working efficiency of the expensive equipment by attenuating impact and vibration transferred to an operator during working or traveling of the equipment.

In order to accomplish these objects, there is provided a seat for heavy equipment having a buffer means in forward and backward directions, which is mounted on a suspension plate and is located between left and right console boxes, according to an embodiment of the present invention, which includes a lower member mounted on the suspension plate; an upper member slidably mounted on the lower member in forward and backward directions of the equipment; a buffer means having one end fixed to the lower member and the other end fixed to the upper member to attenuate impact and vibration generated in the forward and backward directions of the equipment by relative movement of the upper member to the lower member; a tilting means including a frame mounted on the upper member, a hinge shaft fixed to the frame and having both ends fixed to rear parts of the console boxes, a driving shaft rotatably fixed to the frame and having both ends fixed to front parts of the console boxes, and a control handle connected to the driving shaft to adjust the height of the console boxes in accordance with its rotating direction; and a locking means for locking and unlocking forward and backward movement of the upper member against the lower member when a pusher installed on one side of the frame is manipulated; wherein in a main working mode of the equipment, a buffer function is performed through forward and backward movement of the upper member against the lower member, and when the main working mode of the equipment is released, the forward and backward movement of the upper member against the lower member is locked to release the buffer function.

The buffer means may include a first elastic member having one end fixed to a first fixing bar formed on the rear of the upper member and the other end fixed to a fixing piece formed in the center position of the lower member; and a second elastic member having one end fixed to the fixing piece and the other end fixed to a second fixing bar formed in front of the upper member, the second elastic member being arranged in the same line as the first elastic member.

The buffer means may further include a damper having a head part fixed to the rear of the upper member and a rod part fixed to a fixing piece formed in front of the lower member.

The buffer means may include a first elastic member having one end fixed to a first fixing bar formed on the rear of the upper member and the other end fixed to a fixing piece formed in the center position of the lower member; a second elastic member having one end fixed to the fixing piece and the other end fixed to a second fixing bar formed in front of the upper member, the second elastic member being arranged in the same line as the first elastic member; and a damper having a head part fixed to the rear of the upper member and a rod part fixed to a fixing piece formed in front of the lower member, the damper being arranged opposite to the first and second elastic members.

The main working mode of the equipment may be at least one selected among an excavating mode, a loading rocks and dumping mode, and a traveling mode.

The locking means may include locking grooves penetratedly formed on specified positions of a bottom surface of the lower member; lockers rotatably fixed to the upper member and having engagement pieces formed on bottom surfaces thereof to be engaged with the locking grooves, respectively, the locking means including a first locker having a fixing piece formed on an upper surface thereof to project to an upper part of the upper member and a second locker rotatably connected to the first locker; an elastic member for elastically supporting the first locker so that the engagement pieces are locked into the locking grooves; and a cable having one end fixed to a bottom surface of the pusher and the other hand fixed to the fixing piece, the cable locking and unlocking the forward and backward movement of the upper member against the lower member by locking and unlocking the engagement pieces into and from the locking grooves in accordance with the manipulation of the pusher.

The seat for heavy equipment according to an embodiment of the present invention may further include a seat plate which is mounted on the frame of the tilting means and on which the seat is detachably placed.

The seat for heavy equipment according to an embodiment of the present invention may further include a stopper mounted on the lower member to limit forward and backward movement of the first fixing bar and to deter the upper member from getting out of a specified stroke with respect to the lower member.

The tilting means may include a rotary shaft rotatably mounted on a bracket fixed in front of one side surface of the frame, and having one end fixed to the control handle and the other end provided with a screw part formed thereon; a union having a screw hole penetratedly formed in the center thereof to be screw-engaged with the screw part, and converting rotational movement of the rotary shaft into rectilineal movement; and a power transfer member having one end rotatably fixed to the union and the other end rotatably fixed to the bracket mounted on an outer surface of the driving shaft; wherein when the control handle is rotated, the union for converting the rotational movement of the rotary shaft into the rectilineal movement pushes or pulls the power transfer member, and thus the driving shaft is rotated about the hinge shaft to adjust the height of the console boxes.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

As illustrated in FIGS. 2 to 9, a seat for heavy equipment having a buffer means in forward and backward directions, which is mounted on a suspension plate, is composed of a seat part and a seat back part, and is located between left and right console boxes, according to an embodiment of the present invention, includes a lower member 10 mounted on the suspension plate 9 and having guide rails 29 and 30 formed on left and right sides thereof; an upper member 11 slidably mounted on the lower member 10 in forward and backward directions of the equipment (i.e., X-axis direction in which the equipment travels) through rollers 31 and 32 engaged with the guide rails 29 and 30; a buffer means having one end fixed to the lower member 10 and the other end fixed to the upper member 11 to attenuate impact and vibration generated in the forward and backward directions of the equipment by relative movement of the upper member 11 to the lower member 10 in a main working mode of the equipment (e.g., an excavating mode, a loading rocks and dumping mode, a traveling mode, or the like); a tilting means including a frame 25 mounted on the upper member 11, a hinge shaft 28 fixed to the frame 25 and having both ends fixed to rear parts of the console boxes 5 and 6, a driving shaft 27 rotatably fixed to the frame 25 and having both ends fixed to front parts of the console boxes 5 and 6, and a control handle 12 connected to the driving shaft 27 to adjust the height of the console boxes 5 and 6 in accordance with its rotating direction; and a locking means for locking and unlocking forward and backward movement of the upper member 11 against the lower member 10 when a pusher 20 installed on a front side of the frame 25 is manipulated; wherein in the main working mode of the equipment, a buffer function is performed through forward and backward movement of the upper member 11 against the lower member 10, and when the main working mode of the equipment is released, the forward and backward movement of the upper member 11 against the lower member 10 is locked to release the buffer function.

Figure 2:
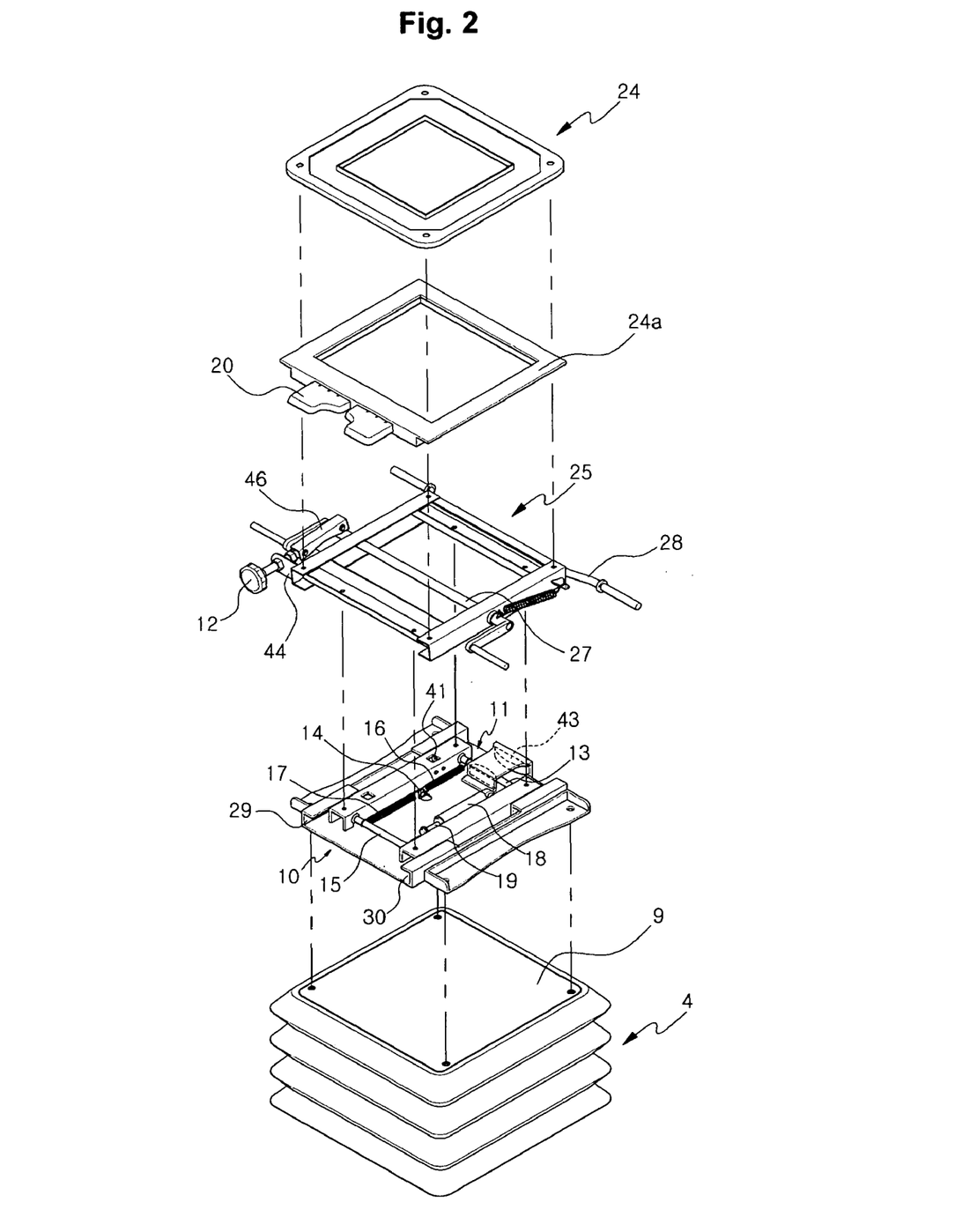
FIG. 2 is an exploded perspective view illustrating buffer means in forward and backward directions mounted on a seat for heavy equipment according to an embodiment of the present invention.
Figure 3:
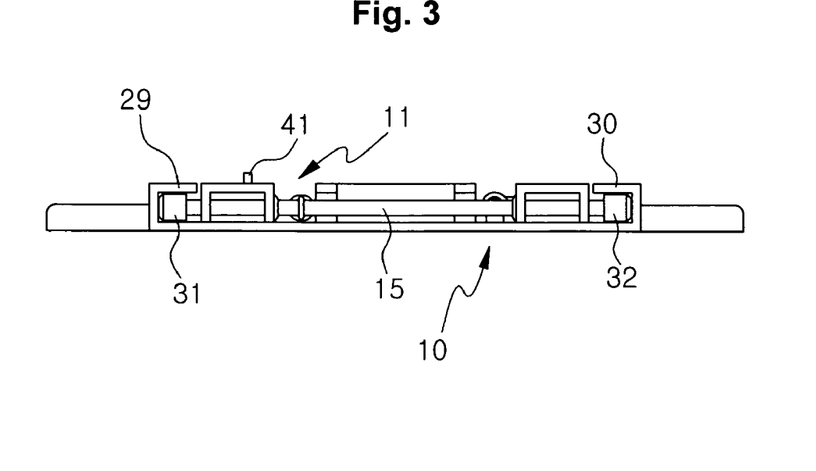
FIG. 3 is a front view illustrating a lower member and an upper member, on which the buffer means of FIG. 2 is mounted, in an engaged state.

The buffer means includes a first elastic member 16 (e.g., a tension coil spring) having one end fixed to a first fixing bar 13 formed on the rear of the upper member 11 and the other end fixed to a fixing piece 14 formed in the center position of the lower member 10; and a second elastic member 17 (e.g., a tension coil spring) having one end fixed to the fixing piece 14 of the lower member 10 and the other end fixed to a second fixing bar 15 formed in front of the upper member 11, the second elastic member 17 being arranged in the same line as the first elastic member 16.

The first and second elastic members 16 and 17 are installed to provide the tension force in the forward and backward directions of the equipment.

The buffer means further includes a damper 18 having a head part fixed to the rear of the upper member 11 and a rod part fixed to a fixing piece 19 formed in front of the lower member 10. The damper 18 is installed to provide the tension force in the forward and backward directions of the equipment.

The buffer means includes a first elastic member 16 having one end fixed to a first fixing bar 13 formed on the rear of the upper member 11 and the other end fixed to a fixing piece 14 formed in the center position of the lower member 10; a second elastic member 17 having one end fixed to the fixing piece 14 of the lower member 10 and the other end fixed to a second fixing bar 15 formed in front of the upper member 11, the second elastic member 17 being arranged in the same line as the first elastic member 16; and a damper 18 having a head part fixed to the rear of the upper member 11 and a rod part fixed to a fixing piece 19 formed in front of the lower member 10, the damper 18 being arranged opposite to the first and second elastic members 16 and 17.

The first and second elastic members 16 and 17 and the damper 18 are installed to provide a tension force and a buffer force in the forward and backward directions of the equipment.

Accordingly, in the case where an impact or vibration is applied in the forward and backward directions of the equipment, the relative movement of the upper member 11 to the lower member 10 becomes possible due to the tension force acting in the forward and backward directions through the first and second elastic members 16 and 17. In addition, the relative movement of the upper member 11 to the lower member 10 becomes possible due to the buffer force acting in the forward and backward directions through the damper 18.

As described above, since the relative movement of the upper member 11 to the lower member 10 becomes possible due to the tension force of the first and second elastic members 16 and 17 and the buffer force of the damper 18, the impact and vibration generated in the forward and backward directions of the equipment can be attenuated during the working or traveling of the equipment.

The main working mode of the equipment may be at least one selected among an excavating mode, a loading rocks and dumping mode, and a traveling mode. In the main working mode of the equipment, the buffer function for attenuating the impact and vibration generated in the forward and backward directions of the equipment is performed, and when the main working mode of the equipment is released, the buffer function is released.

The locking means include locking grooves 21 penetratedly formed on specified positions of a bottom surface of the lower member 10; lockers rotatably fixed to the upper member 11 by engagement pins 22b engaged with engagement grooves 11a formed on the upper member 11 and having engagement pieces 40 formed on bottom surfaces thereof to be detachably engaged with the locking grooves 21, respectively, the locking means including a first locker 22 having a fixing piece 41 formed on an upper surface thereof to project to an upper part of the upper member 11 and a second locker 22a having an engagement groove 22d formed on one side surface thereof to be engaged with an engagement pin 22c so that the second locker 22a is rotatably connected to the first locker 22; an elastic member 42 (e.g., a compression coil spring) (installed between the bottom surface of the upper member 11 and an upper surface of the first locker 22) for elastically supporting the first locker 22 so that the engagement pieces 40 are locked into the locking grooves 21; and a cable 23 having one end connected to a bottom surface of the pusher 20 and the other hand fixed to the fixing piece 41, the cable 23 locking and unlocking the forward and backward movement of the upper member 11 against the lower member 10 by locking and unlocking the engagement pieces 40 into and from the locking grooves 21 in accordance with the manipulation of the pusher 20.

Figure 4:
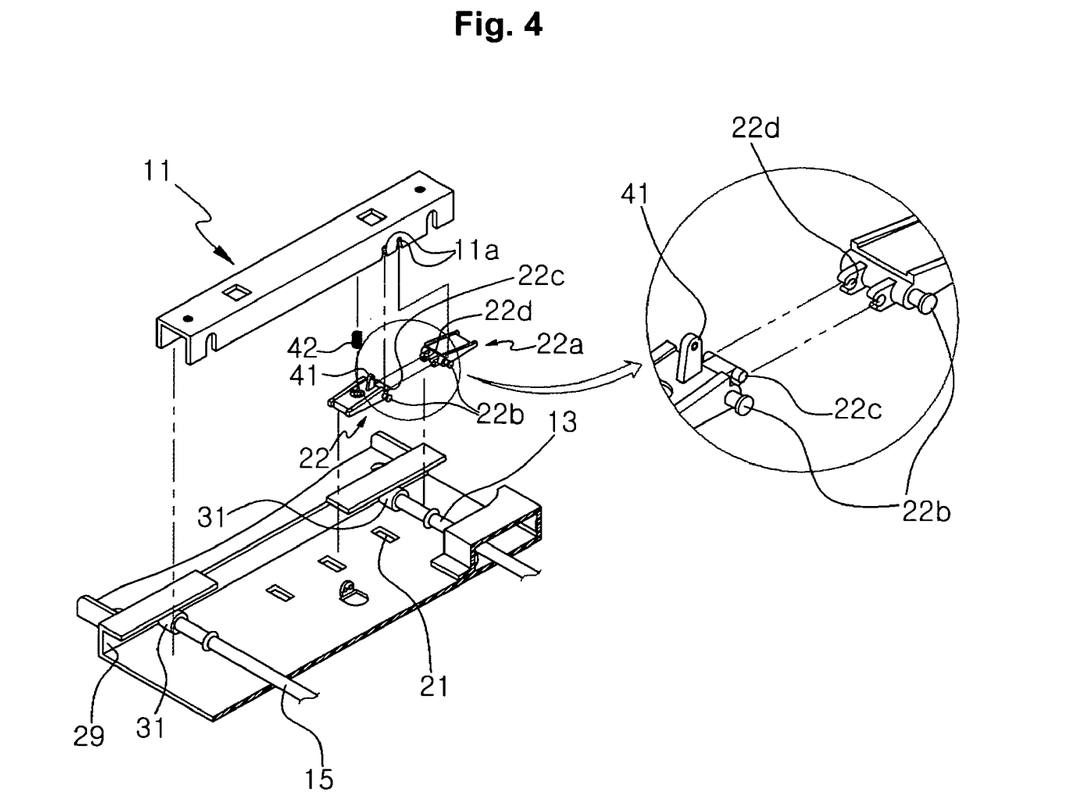
FIG. 4 is an enlarged view of main parts of a locking means as illustrated in FIG. 2.
Figure 5A:
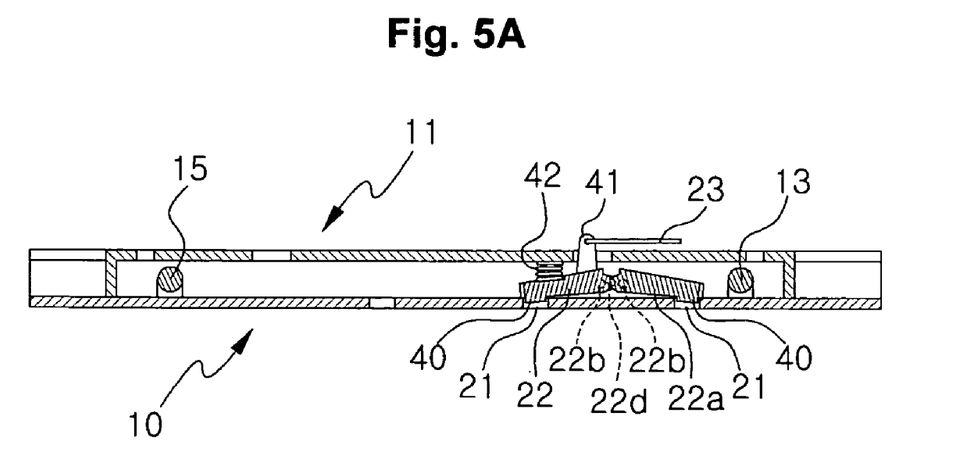
FIGS. 5A and 5B are schematic views illustrating the locking and unlocking states of the upper and lower members in a seat for heavy equipment having a buffer means in forward and backward directions according to an embodiment of the present invention.
Figure 5B:
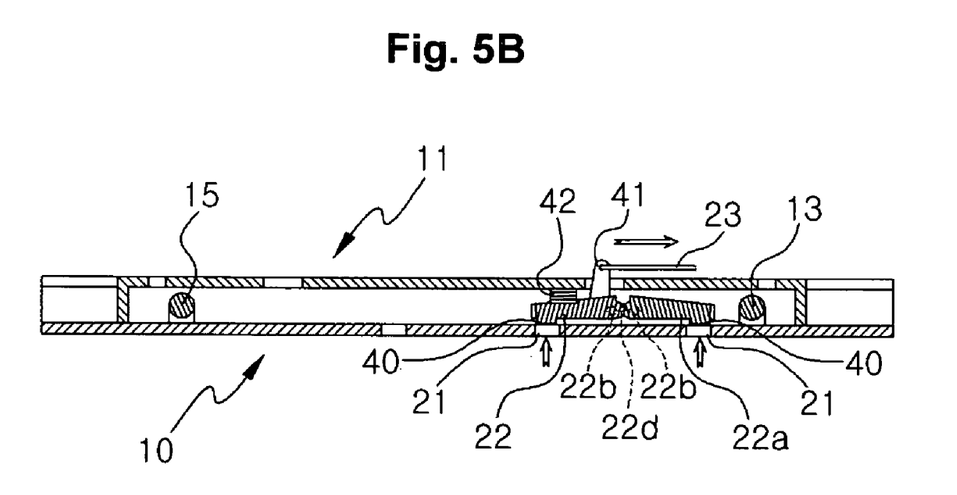

When the pusher 20 is manipulated by the operator, the engagement pieces 40 are locked in or unlocked from the locking grooves 21 through the cable 23, and thus the forward and backward movement of the upper member 11 against the lower member 10 can be locked and unlocked.

The seat for heavy equipment according to an embodiment of the present invention further includes a seat plate 24 which is mounted on the frame 25 of the tilting means and on which the seat 1 is detachably placed. Accordingly, when the buffer means in the forward and backward directions, which is mounted on the upper member 11, is checked or repaired, the seat 1 is lifted up from the seat plate 24, and the normal/abnormal state of the corresponding component mounted on the upper member 11 is easily confirmed.

The seat for heavy equipment according to an embodiment of the present invention further includes a pair of stoppers 43 mounted on the lower member 10 to limit the forward and backward movement of the first fixing bar 13 and to deter the upper member 11 from getting out of a specified stroke with respect to the lower member 10.

Figure 6:
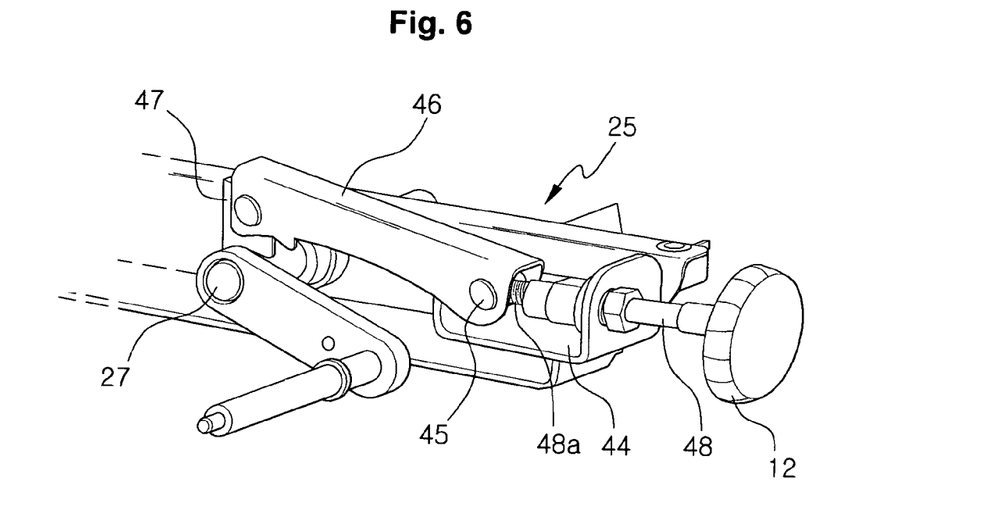
FIG. 6 is a perspective view of main parts of a tilting means as illustrated in FIG. 2.
Figure 7:
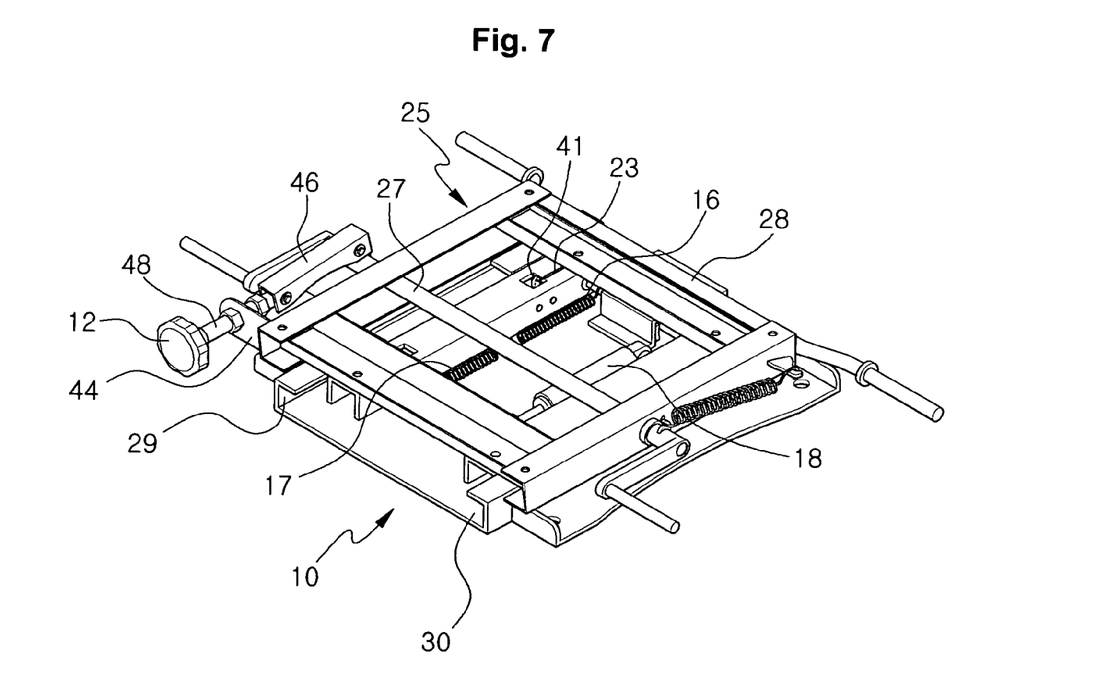
FIG. 7 is a perspective view illustrating a buffer means and a tilting means of FIG. 2 in an engaged state.
Figure 8:
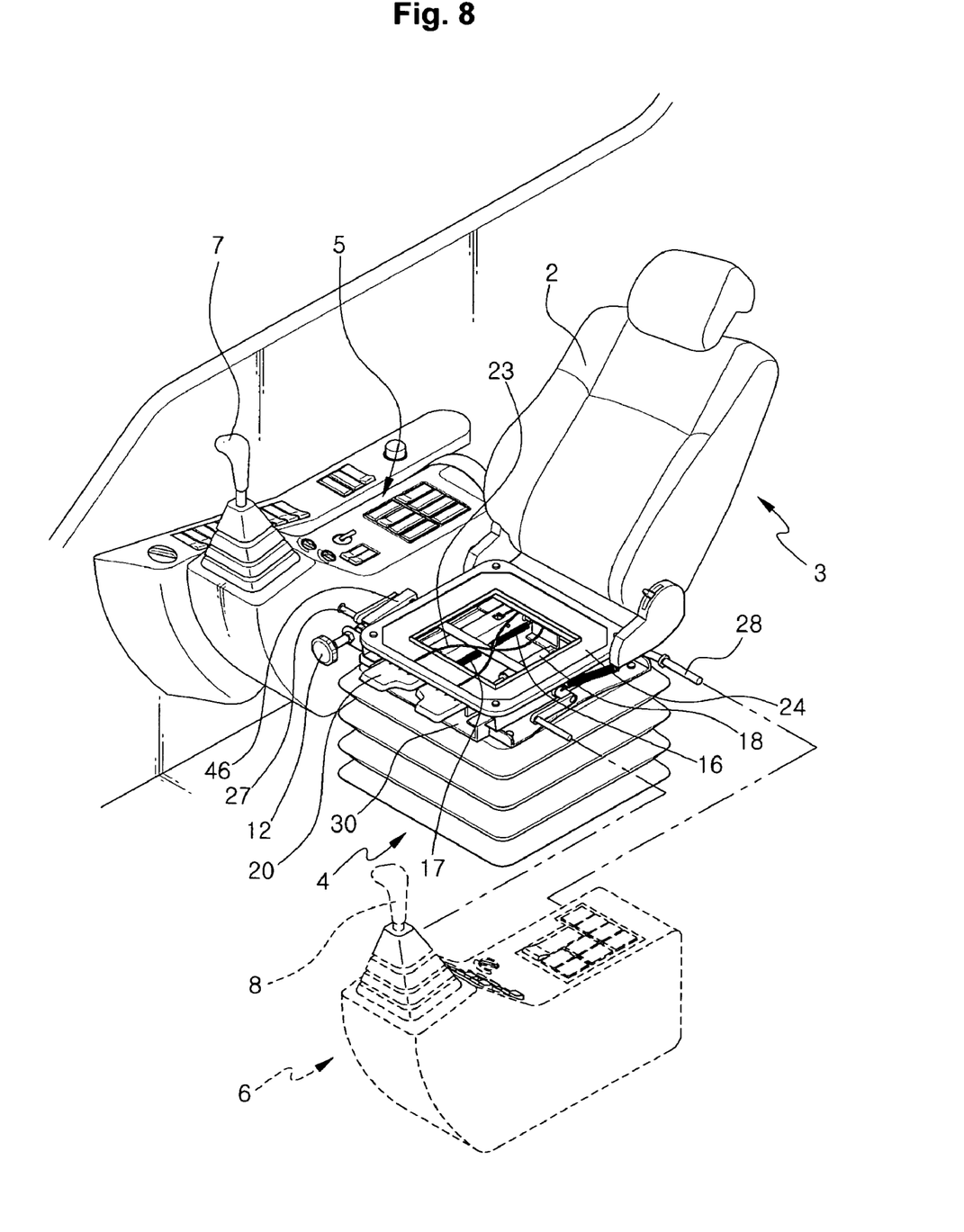
FIG. 8 is a schematic view of a seat in an exploded state, explaining the mounting of a buffer means in forward and backward directions according to an embodiment of the present invention.
Figure 9:
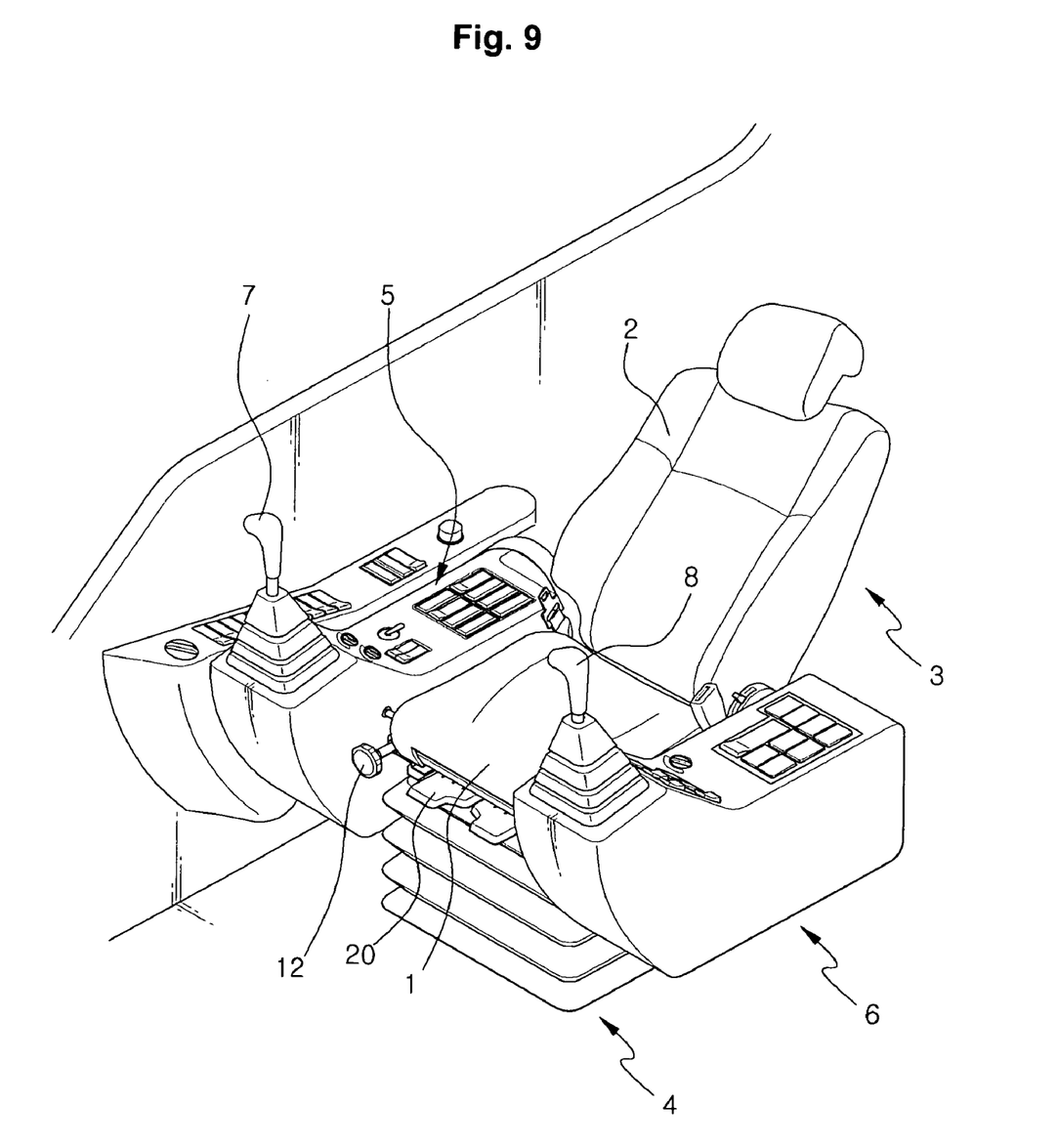
FIG. 9 is a perspective view explaining the mounting of a buffer means in forward and backward directions according to an embodiment of the present invention.

The tilting means includes a rotary shaft 48 rotatably mounted on a bracket 44 fixed in front of one side surface of the frame 25, and having one end fixed to the control handle 12 and the other end provided with a screw part 48a formed thereon; a union 45 having a screw hole penetratedly formed in the center thereof to be screw-engaged with the screw part 48a, and converting the rotational movement of the rotary shaft 48 into rectilineal movement; and a power transfer member 46 (having a "∩"-shaped section) having one end rotatably fixed to the union 45 and the other end rotatably fixed to the bracket 47 mounted on an outer surface of the driving shaft 27; wherein when the control handle 12 is rotated, the union 45 for converting the rotational movement of the rotary shaft 48 into the rectilineal movement pushes or pulls the power transfer member 46 in the forward and backward directions of the equipment, and thus the driving shaft 27 is rotated about the hinge shaft 28 to adjust the height of the console boxes 5 and 6 to match the operating habits and the body shape of the operator.

In the drawing, the reference numeral 24a is a plate which is mounted on the frame 25 and on which the pusher 20 is rotatably installed on one side of the front surface thereof.

Since the constructions, such as the seat 3 composed of the seat part 1 and the seat back part 2, the suspension 4 for attenuating the impact vertically transferred to the seat part 1, the console boxes 5 and 6 for controlling the working device such as a boom in accordance with the amount of manipulation of the manipulation levers 7 and 8, and the like, are substantially the same as those as illustrated in FIG. 1, the detailed description of their construction and operation will be omitted. The same drawing reference numerals are used for the same elements across various figures.

Hereinafter, the operation of the seat for heavy equipment having a buffer means in forward and backward directions according to an embodiment of the present invention will be described with reference to the accompany drawings.

As illustrated in FIGS. 5 to 9, in order to perform a working mode selected among the main working modes (e.g., excavating mode, a loading rocks and dumping mode, and traveling mode), the manipulation levers 7 and 8 mounted on the console boxes 5 and 6 are manipulated to control the operation of the working device such as a boom and so on.

When the pusher 20 formed in front of the frame 25 is pressed downward, as shown in the drawing, the lockers 22 and 22a are pulled toward the rear of the equipment by the tension force of the cable 23 fixed to the bottom surface of the pusher 20. Due to the rotation of the lockers 22 and 22a, the engagement pieces 40 formed on the bottom surface of the lockers 22 and 22a secede from the locking grooves 21 of the lower member 10, respectively, so that the upper member 11 is unlocked from the lower member 10.

Accordingly, the relative movement of the upper member 11 to the lower member 10 becomes possible. That is, rollers 31 and 32 installed on left and right sides of the upper member 11 can slide in forward and backward directions of the equipment in a specified section along guide rails 29 and 30 formed on left and right sides of the lower member 10.

Accordingly, in the case where an impact or vibration is applied in forward and backward directions of the equipment during working or traveling of the equipment in accordance with the main working mode of the equipment, the impact and the vibration can be attenuated by the first and second elastic members 16 and 17 for generating the tension force in the forward and backward directions of the equipment and the damper 18 for generating a buffer force in the forward and backward directions of the equipment.

Accordingly, the impact and vibration being applied to the operator can be minimized, and thus the operator fatigue can be reduced.

On the other hand, when the pusher 20 lifted up to its initial position due to the release of the main working mode of the equipment by the operator, the locker 22 is pressed toward the front of the equipment by the compression force of the cable 23. Due to the rotation of the lockers 22 and 22a, the engagement pieces 40 formed on the bottom surface of the lockers 22 and 22a are engaged with the locking grooves 21 of the lower member 10, respectively, so that the upper member 11 is locked in the lower member 10.

Accordingly, in the case of releasing the main working mode of the equipment, the relative movement of the upper member 11 to the lower member 10 becomes impossible, and thus the buffer function for attenuating the impact and vibration generated in the forward and backward directions of the equipment is released.

On the other hand, since the heavy equipment mostly repeats the same work for many hours according to the characteristic of the equipment, the operator adjusts the height of the console boxes 5 and 6 so that the operator can keep an optimal operating posture in accordance with the operating habits and the body shape of the operator.

When the control handle 12 is rotated clockwise by the operator, the rotational movement of the rotary shaft 48 is converted into the rectilinear movement by the union 45 screw-engaged with the other end of the rotary shaft 48. Accordingly, the power transfer member 46 rotatably fixed to the union 45 is pushed toward the rear of the equipment.

Accordingly, the driving shaft 27 rotatably fixed to the front of the left and right console boxes 5 and 6 is rotated clockwise, as shown in the drawing, and thus the console boxes 5 and 6 are lifted up to the operator.

By contrast, when the control handle 12 is rotated counterclockwise, the power transfer member 46 is pulled toward the front of the equipment by the union 45 screw-engaged with the other end of the rotary shaft 48. Accordingly, the driving shaft 27 rotatably fixed to the front of the console boxes 5 and 6 is rotated counterclockwise, as shown in the drawing, and thus the console boxes 5 and 6 are pulled down to the inner bottom surface of the cab.

Accordingly, the user can manipulate the manipulation levers 7 and 8 of the console boxes 5 and 6 mounted on left and right sides of the cab on the optimal operating posture required in accordance with the body shape of the operator. Accordingly, the operator's fatigue is reduced, and thus the operator can work in an agreeable working environment.

As described above, the seat for heavy equipment having buffer means in forward and backward directions according to the embodiments of the present invention has the following advantages.

Impact and vibration generated in a cab in forward and backward directions of an excavator are attenuated in accordance with the driving of a buffer means in a main working mode of an excavator, and thus the operator can be protected.

In addition, since the impact and vibration transferred to an operator during working or traveling of the equipment are attenuated, the operator fatigue can be reduced, and the working efficiency and the reliability of the expensive equipment can be improved.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A seat for heavy equipment having a buffer means in forward and backward directions, which is mounted on a suspension plate and is located between left and right console boxes, the seat for heavy equipment comprising:
    a lower member mounted on the suspension plate;
    an upper member slidably mounted on the lower member in forward and backward directions of the equipment;
    a buffer means having one end fixed to the lower member and the other end fixed to the upper member to attenuate impact and vibration generated in the forward and backward directions of the equipment by relative movement of the upper member to the lower member;

a tilting means including a frame mounted on the upper member, a hinge shaft fixed to the frame and having both ends fixed to rear parts of the console boxes, a driving shaft rotatably fixed to the frame and having both ends fixed to front parts of the console boxes, and a control handle connected to the driving shaft to adjust the height of the console boxes in accordance with its rotating direction; and a locking means for locking and unlocking forward and backward movement of the upper member against the lower member when a pusher installed on one side of the frame is manipulated;

wherein in a main working mode of the equipment, a buffer function is performed through forward and backward movement of the upper member against the lower member, and when the main working mode of the equipment is released, the forward and backward movement of the upper member against the lower member is locked to release the buffer function; and a damper having a head part fixed to the rear of the upper member and a rod part fixed to a fixing piece formed in front of the lower member, the damper being arranged opposite to the first and second elastic members.

2. The seat for heavy equipment of claim 1, wherein the buffer means comprises:

a first elastic member having one end fixed to a first fixing bar formed on the rear of the upper member and the other end fixed to a fixing piece formed in the center position of the lower member; and a second elastic member having one end fixed to the fixing piece and the other end fixed to a second fixing bar formed in front of the upper member, the second elastic member being arranged in the same line as the first elastic member.

3. The seat for heavy equipment of claim 1, wherein the main working mode of the equipment is at least one selected among an excavating mode, a loading rocks and dumping mode, and a traveling mode.

4. The seat for heavy equipment of claim 1, wherein the locking means comprises:

locking grooves penetratedly formed on specified positions of a bottom surface of the lower member;

lockers rotatably fixed to the upper member and having engagement pieces formed on bottom surfaces thereof to be engaged with the locking grooves, respectively, the locking means including a first locker having a fixing piece formed on an upper surface thereof to project to an upper part of the upper member and a second locker rotatably connected to the first locker;

an elastic member for elastically supporting the first locker so that the engagement pieces are locked into the locking grooves; and a cable having one end fixed to a bottom surface of the pusher and the other hand fixed to the fixing piece, the cable locking and unlocking the forward and backward movement of the upper member against the lower member by locking and unlocking the engagement pieces into and from the locking grooves in accordance with the manipulation of the pusher.

5. The seat for heavy equipment of claim 1, further comprising a seat plate which is mounted on the frame of the tilting means and on which the seat is detachably placed.

6. The seat for heavy equipment of claim 1, further comprising a stopper mounted on the lower member to limit forward and backward movement of the first fixing bar and to deter the upper member from getting out of a specified stroke with respect to the lower member.

7. The seat for heavy equipment of claim 1, wherein the tilting means comprises:

a rotary shaft rotatably mounted on a bracket fixed in front of one side surface of the frame, and having one end fixed to the control handle and the other end provided with a screw part formed thereon;

a union having a screw hole penetratedly formed in the center thereof to be screw-engaged with the screw part, and converting rotational movement of the rotary shaft into rectilineal movement; and a power transfer member having one end rotatably fixed to the union and the other end rotatably fixed to the bracket mounted on an outer surface of the driving shaft;

wherein when the control handle is rotated, the union for converting the rotational movement of the rotary shaft into the rectilineal movement pushes or pulls the power transfer member, and thus the driving shaft is rotated about the hinge shaft to adjust the height of the console boxes.

* * * * *